March 4, 1952 A. L. ARENBERG ET AL 2,587,807
CAR LIGHTING STRUCTURE
Filed July 25, 1947 2 SHEETS—SHEET 1
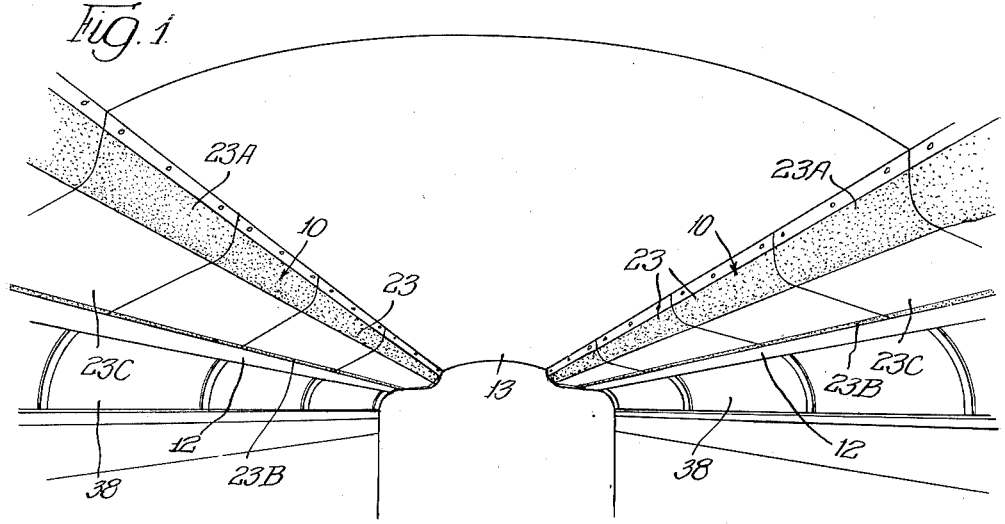
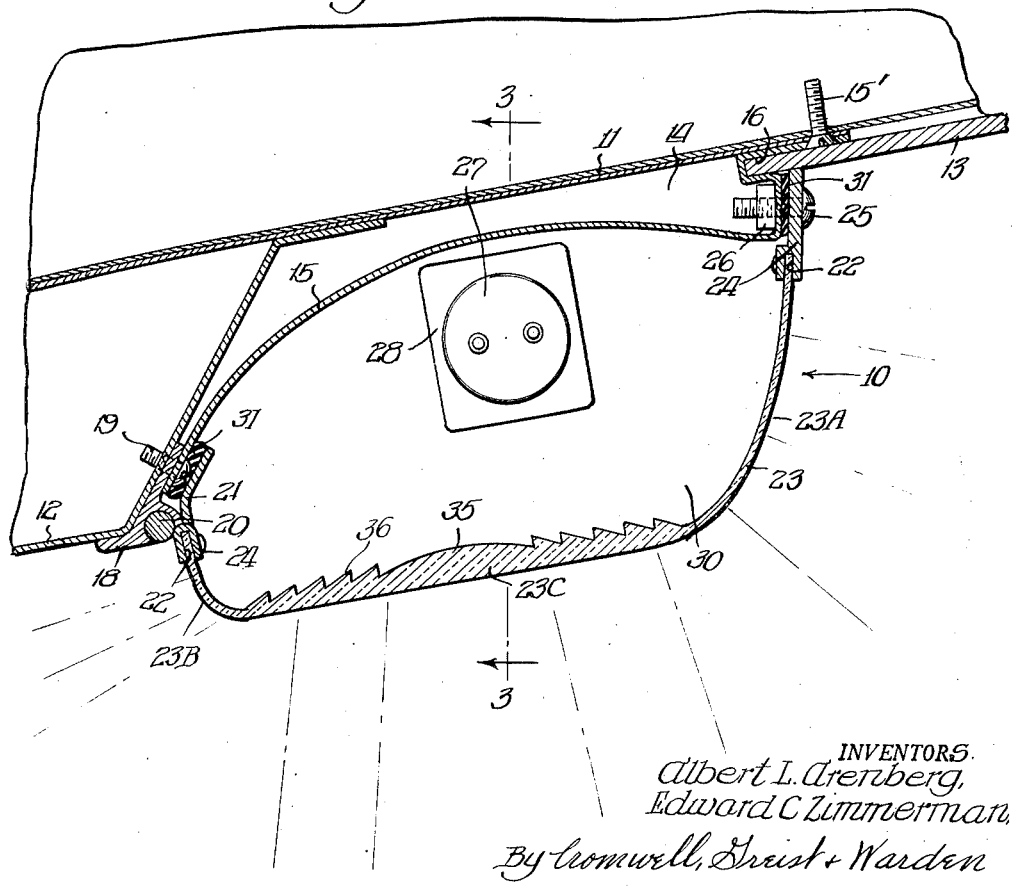
INVENTORS.
Albert L. Arenberg,
Edward C. Zimmerman,
By Cromwell, Greist & Warden
Attys

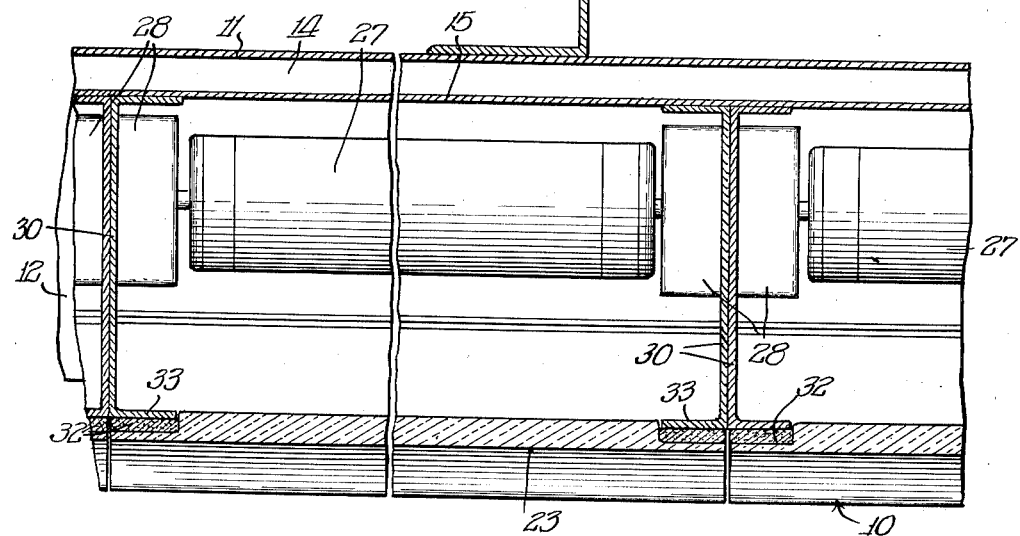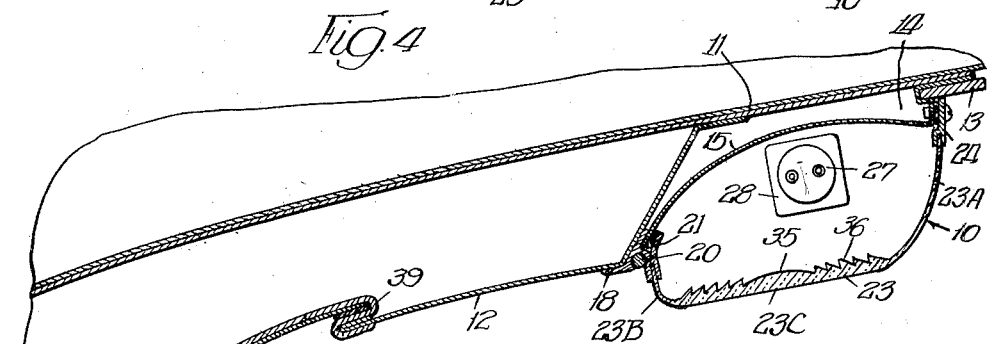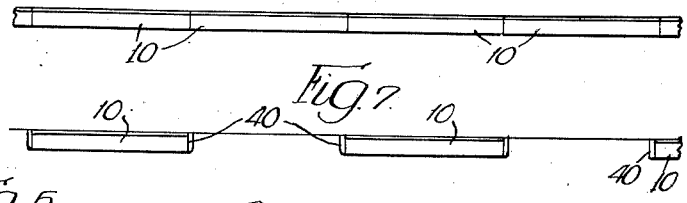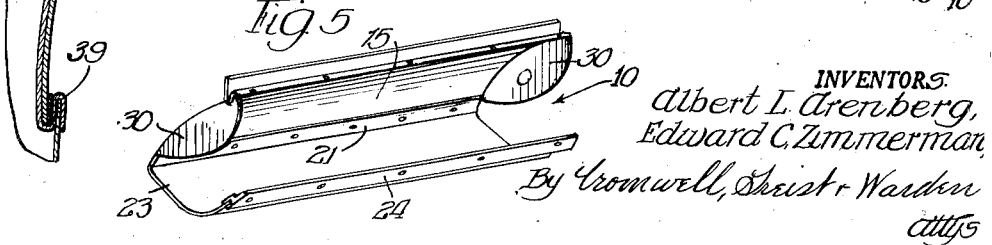

Patented Mar. 4, 1952

2,587,807

UNITED STATES PATENT OFFICE 2,587,807

CAR LIGHTING STRUCTURE

Albert L. Arenberg, Highland Park, and Edward C. Zimmerman, Winnetka, Ill., assignors to Patent License Corporation, Chicago, Ill., a corporation of Illinois Application July 25, 1947, Serial No. 763,580

3 Claims. (Cl. 240—7.35)

This invention pertains generally to a lighting system adapted for installation in passenger vehicles such as railway cars, buses, trolleys and the like, and more particularly to a novel fixture receivable in a space in the vehicle heretofore employed for another purpose.

It is an object of the invention to provide an interior illuminating and car card lighting structure including a novel, elongated fixture adapted to be installed in the interior of the vehicle car to one side of a central aisle thereof, the body of said fixture occupying a space adjacent the deck of the vehicle normally employed for the purpose of housing cables, or for a heating or ventilating duct, and depending at its rear thereof sufficiently beneath the deck to direct light onto the usual advertising cards disposed along the side of the car.

A further object of the invention is to provide a vehicle illuminating system embodying a series of fixtures of the foregoing type adapted to be installed in the manner referred to to afford a pleasing continuity of surface adjoining the vehicle deck adjacent the center aisle, which fixtures are adapted to flood the vehicle interior with attractive diffused light, including lateral illumination of the car cards, as well as to direct condensed reading beams downwardly onto the reading plane of passengers seated therebeneath.

A still further object is to provide an elongated lighting structure having the foregoing provisions for affording a general, diffused illumination of the interior of the vehicle, and in particular areas along the sides thereof mounting car cards or like advertising matter, which occupies a minimum of space and which blends in an attractive and unobtrusive manner with adjacent surfaces of the vehicle.

More specifically, it is an object of the invention to provide an interior lighting system or structure for passenger vehicles including rows of translucent fixtures adapted to extend lengthwise of the vehicle on either side of the central aisle of the latter, said fixtures being exposed at the rear thereof slightly below the level of the vehicle deck and having provision for emitting laterally outwardly directed and continuous, preferably diffused rays impinging the adjacent area at which car cards are normally exhibited, in a manner to clearly illuminate the cards, said structure being installed in the vehicle by a relatively simple operation.

The foregoing statements are indicative in a general way of the nature of the invention, but other and more specific objects will be apparent to those skilled in the art upon a full understanding of the construction and operation of the device.

A single embodiment of the invention is presented herein for purpose of exemplification, but it will be appreciated that the invention is susceptible of incorporation in other modified forms coming equally within the scope of the appended claims.

In the drawings,

Fig. 1 is a fragmentary perspective view illustrating a portion of a vehicle interior in which the lighting system of the invention is installed;

Fig. 2 is an enlarged fragmentary view in vertical transverse section through the installation;

Fig. 3 is a fragmentary view in section taken generally along the line 3—3 of Fig. 2;

Fig. 4 is a fragmentary view in section generally similar to Fig. 2 but in somewhat smaller scale, illustrating general features of the installation as regards the relationship of the fixture to a row of car cards illuminated thereby;

Fig. 5 is a perspective view conventionally illustrating one of the fixtures embodied in the system as opened and exposed for servicing or for removal and replacement of a lighting element; and Figs. 6 and 7 are diagrammatic views illustrating two alternative installations of the fixture contemplated by the invention.

The present invention affords an improved car lighting system, especially designed for convenient and expeditious installation in a passenger vehicle interior in the space adjacent the center aisle ceiling and side deck thereof, which space is normally enclosed by an extension of the deck and employed to house cables or the like, or, in some cases, as a duct for the distribution of heating or ventilating air. The system is built up of a plurality of individual, elongated fixtures, generally designated by the reference numeral 10, which may either be installed in a continuous end-to-end manner along the opposed sides of the central passenger aisle, as illustrated in Figs. 1 and 3 and 6, or, in the longitudinally spaced fashion illustrated in Fig. 7.

Referring to Figs. 1, 2 and 3, wherein specific details of the structure are illustrated, the reference numeral 11 designates the usual, curved, upper ceiling surface of a passenger vehicle which extends from side to side of the vehicle. The sheet metal deck members 12 which are secured to said surface define space beneath the latter for the reception of various cables and the like or to serve as heating or ventilating duct, and, in the normal vehicle construction, the lower surface of these deck members merges with similar members (not shown) on the inner sides thereof which, in turn, arch inwardly and upwardly to the ceiling adjacent the side edges of the finished central or aisle panel 13 of the ceiling.

In accordance with the principle of the present invention, the longitudinally extending space 14 immediately adjacent either side of said last named center ceiling panel, between the same and the deck members 12 (see Figs. 3 and 4), which is employed to receive the improved fixtures 10. The arrangement is such that when so installed, said fixture completes a pleasing, inwardly and upwardly curved sweep to the center panel and imparts a continuous, relatively uninterrupted and unobtrusive appearance of the area immediately adjoining said panel.

In accordance with the invention, the fixture 10 comprises the upper sheet metal backing or housing member 15 which is adapted to be fixedly secured in place in the space 14. To this end, the members 15 are secured to ceiling surface 11 by a series of screws 15' along the inner longitudinal edge thereof. They are preferably provided with a longitudinally extending groove or channel 16 in which the edge of the panel 13 may be snugly disposed, as illustrated in Fig. 2. Along the opposite rear and lower edges thereof the housing members 15 carry a longitudinally extending, extruded metal hinge socket 18 which, together with the attached housing member 15, may be secured to the adjacent inclined surface of deck member 12 by means of a longitudinally extending row of screws 19. However, other methods of securing the housing and socket 18 to the deck may be resorted to.

The hinge socket 18 receives the integral hinge pins 20 on the elongated, extruded metal rear frame member 21 of the fixture, said frame member being shaped to provide a continuous downwardly opening groove 22 wherein the rear margin of the translucent lighting panel 23 is received and appropriately held, as by rivets or the like. The inner or front margin of the panel 23, i. e., opposite the extruded hinge member 18, 20, is received in a similar groove 22 in a generally similar, extruded metal, front frame member 24 paralleling rear member 21. The panel 23 is releasably held in closed position by means of a series of screws 25 spaced along frame member 24 which are threadedly received in nut members 26 soldered, welded or otherwise secured to the housing member 15, in the manner shown in Fig. 2.

When it is desired to open the fixture 10, as for the removal and replacement of the standard elongated fluorescent lighting tube 27 from the conventional sockets 28 at either end thereof, this is readily done by removing the screws 25 and allowing the panel 23 to swing downwardly about its hinge pins 20 to the opened position thereof shown in Fig. 5. Similarly, the extruded hinge structure shown greatly facilitates assembly or dismantling of the fixtures constituting a lighting system, by simply sliding the pins 20 lengthwise of and into or out of the sockets 18. Each fixture 10 is completed by the downwardly extending end walls 30 appropriately welded or otherwise secured to the housing 15 at either end thereof.

Entry of dust, dirt and foreign matter into the interior of the fixture is prevented by the self-sealing felt strips 31 disposed between the coacting surfaces of the respective front and rear panel frames 21, 24 and the housing member 15. As illustrated in Figs. 3 and 5, the downwardly extending housing end walls 30 are inwardly flanged at 33 and are shaped in conformity with the shape of the translucent panel 23, so that the latter can be swung into engagement at its ends with the felt sealing strips 32 disposed along said in-turned flanges. This results in a very complete and satisfactory, dust-tight sealing of the interior of the fixture 10. The end housing walls 30 carry the sockets 28 for the fluorescent tube 27, said sockets being properly wired in a well-known way not necessary to illustrate.

The fixture panel 23 may be molded of glass, or transparent or translucent plastic, and may be appropriately treated to render the same entirely light-diffusive in character or partly light-diffusive and partly light condensing, as in the illustrated example. In the form chosen for illustration, the forwardly and rearwardly exposed surfaces of panel 23, designated respectively by the reference characters 23A and 23B, are frosted, painted, enameled or similarly treated to render the same translucent or light-dispersive in action so as to flood the zones on either side with diffused illumination, while the center portion 23C of the panel extending longitudinally of the latter is left transparent and is provided with the internal lens and prismatic configurations 35, 36. This imparts a light-condensing action to the panel along its central area, with the result that an intensified reading beam is directed downwardly from the fixture onto the reading plane of passengers seated therebeneath.

A feature of substantial importance of the present invention resides in the fact that the fixture, and particularly the light-transmissive panel 23 thereof, is so located and disposed in the space 14 that the rearwardly or outwardly facing, elongated diffusing area 23B depends somewhat beneath deck 12 and affords substantial illumination by diffused floodlighting of the area in which conventional car cards 38 are situated, as illustrated in Fig. 4. Such cards are normally disposed in parallel ways or grooves 39 formed to receive the same in the outer continuation of the deck 12.

As illustrated in Figs. 6 and 7, the lighting system may be built up in the form of a continuous longitudinal series of the fixtures 10 arranged in end-to-end relation along the vehicle, at either side of the aisle thereof, as in Fig. 6, or the fixtures may be spaced longitudinally in any desired arrangement, as in Fig. 7. In the latter case, it is desirable to provide suitable end finish plates 40 in association with the housing end walls to furnish an attractive exterior.

It is apparent that the invention provides a lighting system and improved fixture as a component thereof which illuminate the interior of the vehicle in a very effective manner, flooding the zone on either side of the fixture, including the car card zone, with a substantial illumination of diffused character, while directing intensified reading beams downwardly through a medial zone of the fixture. At the same time, said fixture in effect constitutes a finished continuation of the deck 12, and the attractiveness of the arrangement is reasonably well illustrated in Fig. 1 of the drawings. Slight modification of existing car interiors enable the installation of the present system with a minimum expenditure of time, labor and money, with the overall effect of greatly modernizing and streamlining the interior appearance of relatively old-style vehicles.

We claim:

1. A vehicle lighting fixture especially devised for positioning in a recessed space of a vehicle interior which opens outwardly and downwardly between an adjoining lower deck surface and a substantially higher center aisle ceiling, said fixture comprising a light housing adapted to be fitted in said space and provided with means to mount a light source in the housing, said housing including a relatively elongated, trough-like, lower light transmissive panel closing said housing, said panel comprising a rear light transmitting wall adapted to be secured to said adjoining deck surface which is of sufficient height to depend slightly beneath said deck surface, an intermediate clear section of substantial width, and a front light transmitting wall, the height of said front wall being sufficiently greater than that of said rear wall to extend said panel upwardly approximately to said higher center aisle ceiling, means connected to the upper portion of said rear wall for hinging said panel to said deck surface, said hinge means being disposed to extend outwardly of the panel in a direction away from said front wall for engagement with said deck surface and acting to position said panel in its entirety on the aisle side of said deck surface, and means on the upper edge of said front wall to secure the same to said housing, said mounting means supporting a light source in position to direct rays through said clear section and both of said light transmitting walls.

2. A vehicle lighting fixture especially devised for positioning in a recessed space of a vehicle interior which opens outwardly and downwardly between an adjoining lower deck surface and a substantially higher center aisle ceiling, said fixture comprising a light housing member adapted to be fitted in said space and provided with means to mount a light source, a relatively elongated, trough-like, lower light transmissive panel closing said housing, said panel comprising a rear light transmitting wall adapted to be pivoted to said adjoining deck surface which is of sufficient height to depend slightly beneath said deck surface, an intermediate clear light transmitting section of substantial width disposed to approximately parallel said deck surface and aisle ceiling and having an internal lens configuration, and a front light transmitting wall, the height of said front wall being sufficiently greater than that of said rear wall to extend said panel upwardly approximately to said higher center aisle ceiling adjacent the forward edge of said housing member, means connected to the upper portion of said rear wall for hinging said panel to said deck surface, said hinge means being disposed to extend outwardly of the panel in a direction away from said front wall for engagement with said deck surface and acting to position said panel in its entirety on the aisle side of said deck surface, and means connected to the upper edge of said front wall to secure the same to said housing member said mounting means supporting a light source in position to direct rays through said light transmitting section and both of said light transmitting walls.

3. The combination with a passenger vehicle characterized by an interior longitudinally extending aisle, a deck surface extending longitudinally alongside said aisle and an aisle ceiling located directly above said aisle at a substantially higher elevation than said deck surface, there being a longitudinally extending recess between said deck surface and ceiling which opens outwardly of said deck surface and downwardly between said surface and said aisle ceiling, of a light housing provided with a source of light secured in said recess and including a relatively elongated, trough-like light transmissive panel, said panel having a rear light transmitting wall which is of sufficient height to depend slightly beneath said deck surface, an intermediate clear section of substantial width, and a front light transmitting wall, the height of said front wall being sufficiently greater than that of said rear wall to extend approximately to said center aisle ceiling, said rear wall being hinged along the adjacent edge of said deck surface, and means connected to the upper edge of said front wall to secure the same to said housing, said panel being positioned substantially in its entirety on the aisle side of said deck surface, and said light source being mounted in said light housing in position to direct light rays through all of said light transmitting walls.

ALBERT L. ARENBERG.
EDWARD C. ZIMMERMAN.

REFERENCES CITED

The following references are of record in the file of this patent:

UNITED STATES PATENTS

| Number | Name | Date |
|---|---|---|
| 2,167,383 | Arenberg | July 25, 1939 |
| 2,327,230 | Weber | Aug. 17, 1943 |
| 2,332,040 | Zampol | Oct. 19, 1943 |
| 2,428,827 | Beck | Oct. 14, 1947 |
| 2,434,049 | Nordquist | Jan. 6, 1948 |